(12) United States Patent
Ressler

(10) Patent No.: US 12,071,972 B2
(45) Date of Patent: Aug. 27, 2024

(54) TENSIONING TOOL, TENSIONING SYSTEM, AND METHOD FOR DEPLOYING THE TENSIONING SYSTEM

(71) Applicant: Dutch Clips LLC, Lancaster, PA (US)

(72) Inventor: Thomas Ressler, Reinholds, PA (US)

(73) Assignee: Dutch Clips LLC, Lancaster, PA (US)

( * ) Notice: Subject to any disclaimer, the term of this patent is extended or adjusted under 35 U.S.C. 154(b) by 0 days.

(21) Appl. No.: 17/150,508

(22) Filed: Jan. 15, 2021

(65) Prior Publication Data

US 2022/0228623 A1 Jul. 21, 2022

(51) Int. Cl.
| | |
|---|---|
| *F16B 45/00* | (2006.01) |
| *E04H 15/64* | (2006.01) |
| *F16G 11/04* | (2006.01) |
| *F16G 11/14* | (2006.01) |

(52) U.S. Cl.
CPC .............. *F16B 45/00* (2013.01); *E04H 15/64* (2013.01); *F16G 11/046* (2013.01); *F16G 11/14* (2013.01); *Y10T 24/3916* (2015.01)

(58) Field of Classification Search
CPC ........ F16B 45/00; F16B 45/002; E04H 15/64; E04H 15/322; Y10T 24/3916; F16G 11/046; F16G 11/14
See application file for complete search history.

(56) References Cited

U.S. PATENT DOCUMENTS

| | | | | |
|---|---|---|---|---|
| 1,205,496 | A * | 11/1916 | Whitehead | F16G 11/00 24/129 R |
| 2,386,836 | A * | 10/1945 | Blagden | B60P 3/075 410/21 |
| 3,675,276 | A * | 7/1972 | Nuse | A01K 91/04 24/130 |
| 4,910,834 | A * | 3/1990 | Minkler | B60P 7/0823 24/129 A |
| 5,625,925 | A * | 5/1997 | Richards | B60P 7/0823 24/129 B |
| 6,412,833 | B2 * | 7/2002 | Lusk | G09B 19/00 289/1.5 |
| 6,966,520 | B2 * | 11/2005 | Sherman | B63B 21/08 242/388.4 |
| 7,353,766 | B1 * | 4/2008 | Wiese | B63B 21/045 114/218 |
| 7,513,073 | B1 * | 4/2009 | Smith | G09F 7/18 40/607.05 |
| 7,636,986 | B2 * | 12/2009 | Sorensen | B60P 7/0823 24/129 A |
| D629,288 | S * | 12/2010 | Kelleghan | D8/356 |
| 7,856,699 | B2 * | 12/2010 | Sorensen | B60P 7/0823 24/130 |
| 8,209,823 | B2 * | 7/2012 | Apicella | A62B 1/14 24/130 |

(Continued)

*Primary Examiner* — Robert Sandy
*Assistant Examiner* — Louis A Mercado
(74) *Attorney, Agent, or Firm* — Barley Snyder

(57) ABSTRACT

A tensioning tool having a body and two hooks. One hook extends radially outward from the body and the second hook extends tangentially of the body. The body has a grip opening extending through the body and a throughhole extending through the body. A tensioning system comprising the tensioning tool and two cords. One cord passes through the throughhole in the body of the tensioning tool and the second cord is secured in the first hook of the tensioning tool.

6 Claims, 4 Drawing Sheets

(56) References Cited

U.S. PATENT DOCUMENTS

| | | | | |
|---|---|---|---|---|
| D694,613 | S | * | 12/2013 | Miles .............................. D8/367 |
| 9,433,261 | B1 | * | 9/2016 | Miles .................... B60P 7/0823 |
| 9,528,655 | B1 | * | 12/2016 | Miles .................... B60P 7/0823 |
| D846,371 | S | * | 4/2019 | Gilbert ........................... D8/356 |
| 11,242,911 | B1 | * | 2/2022 | Ezykowsky ............ F16G 11/14 |
| 2006/0054070 | A1 | * | 3/2006 | Lopes Praca ......... F16G 11/103 |
| | | | | 114/218 |

* cited by examiner

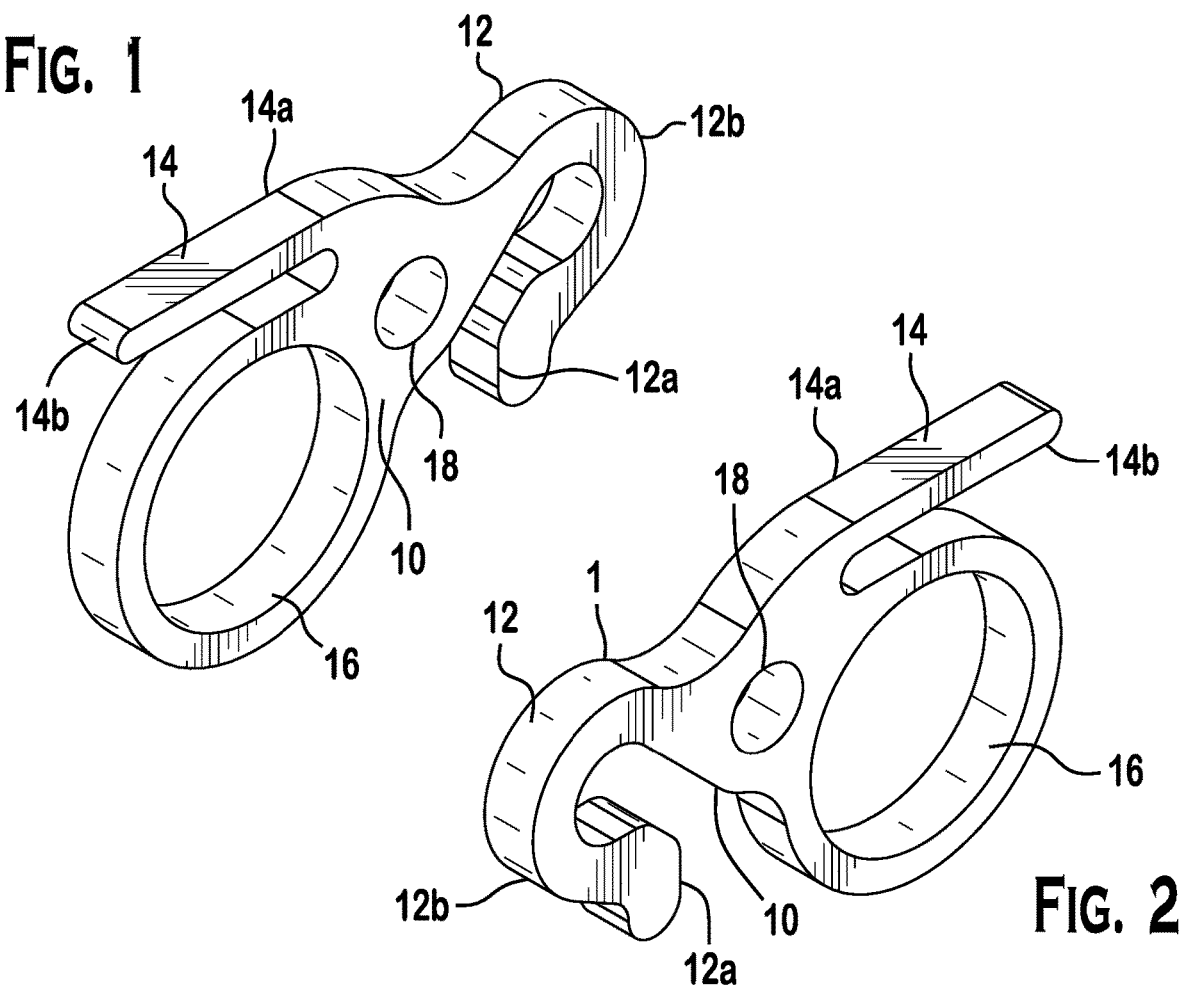
FIG. 1
FIG. 2
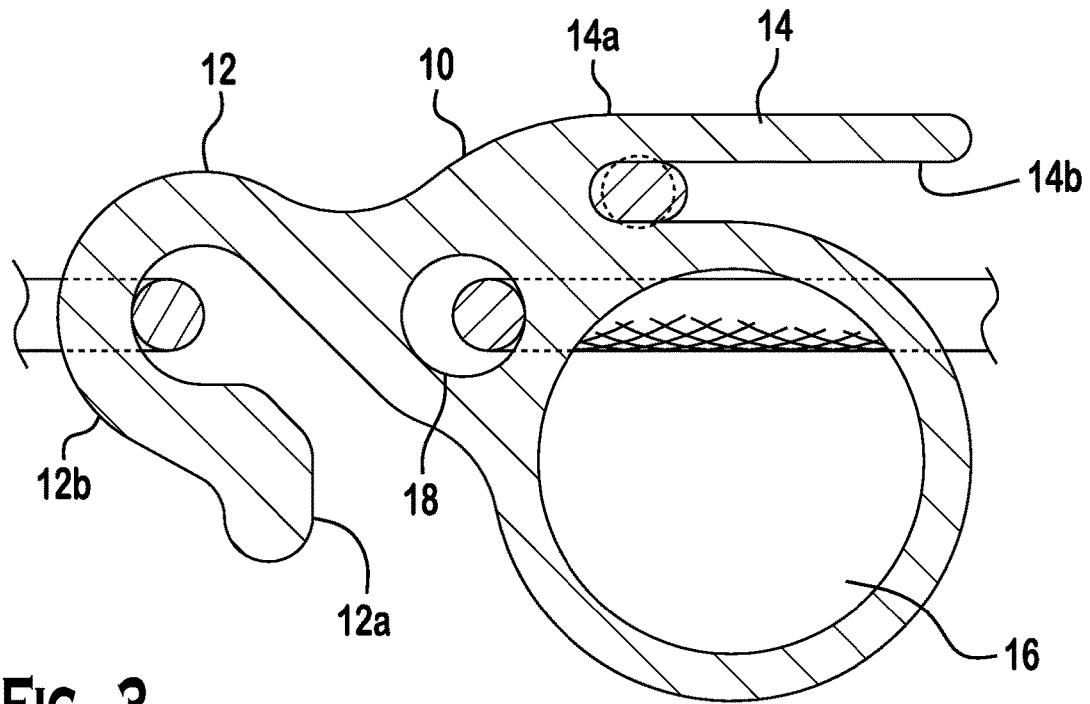
FIG. 3

TENSIONING TOOL, TENSIONING SYSTEM, AND METHOD FOR DEPLOYING THE TENSIONING SYSTEM

FIELD OF THE INVENTION

The present invention relates, in general, to tensioning tools and tensioning systems and, in particular, to a tensioning tool and a tensioning system for connecting two objects.

BACKGROUND

Tools for securing cordage or webbing between two objects or points of attachment are of interest in many applications. In particular, such tools are used to quickly set, maintain, or adjust tension in cordage or webbing for camping equipment, such as tents, tarpaulins (tarps), hammocks, flys, and similar shelters or other structures.

Tensioning tools that set, maintain, and adjust the tension in cordage or webbing are preferably not bulky, weighty, or cumbersome, and often include various hooks, eyes, cleats, grips, pulleys, and the like, which require multiple knots to function.

SUMMARY OF THE INVENTION

A tensioning tool, constructed in accordance with the present invention, includes a body and first and second hooks. The body has a grip opening extending through the body and a throughhole extending through the body. The first hook extends radially outward from the body and the second hook extends tangentially of the body.

A tensioning system, constructed in accordance with the present invention, includes the tensioning tool described immediately above, a first cord extending through the throughhole in the body of the tensioning tool and the second hook of the tensioning tool, and a second cord extending through the first hook of the tensioning tool.

A method for deploying a tensioning system, constructed in accordance with the present invention, comprises the steps of: (1) providing the tensioning tool described above; (2) providing a first cord; (3) passing the first cord through the throughhole in the body of the tensioning tool; (4) fitting the cord into the second hook of the tensioning tool; (5) providing a second cord; (6) capturing second cord in the first hook of the tensioning tool; and (7) removing slack in the second cord and making taut the second cord.

BRIEF DESCRIPTION OF THE DRAWINGS

The present invention will now be described by way of example with reference to the accompanying drawings of which:

FIG. 1 is a perspective front view of a tensioning tool, constructed in accordance with the present invention.

FIG. 2 is a perspective rear view of the FIG. 1 tensioning tool.

FIG. 3 is a sectional view of the FIG. 1 tensioning tool with cordage passing through the tensioning tool.

DETAILED DESCRIPTION OF THE INVENTION

Figure 4:
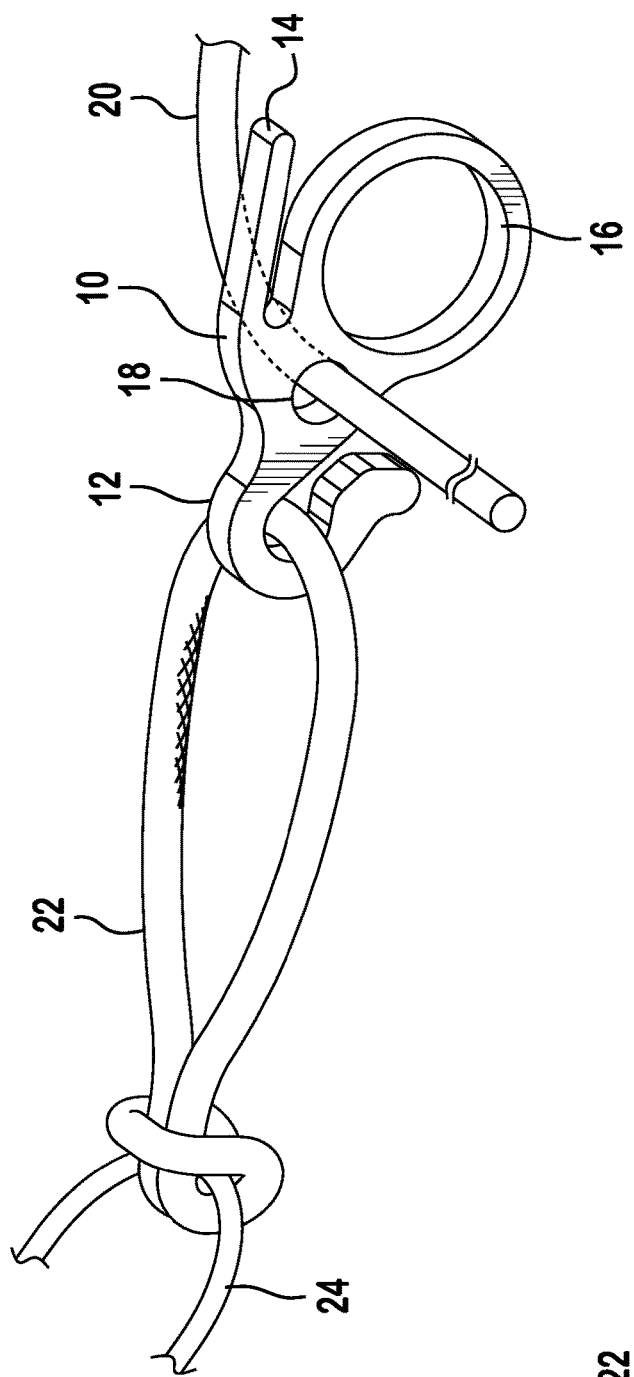
FIG. 4 is a perspective view of a tensioning system, constructed in accordance with the present invention, at a first stage of deployment of the tensioning system.

Referring to FIGS. 1, 2, and 3, a tensioning tool, constructed in accordance with the present invention, includes a body 10, a first hook 12, and a second hook 14. Body 10 has a grip opening 16 extending through the body and a throughhole 18 extending through the body. First hook 12 extends radially outward from the body 10. Second hook 14 extends tangentially of body 10.

First hook 12 has an open end 12*a* at body 10 and a closed end 12*b* remote from body 10. Second hook 14 has a closed end 14*a* in proximity to the throughhole in the body 10. Open end 12*a* of first hook 12 projects outwardly from the longitudinal axis of the first hook.

Referring to FIGS. 4 through 9, a tensioning system, constructed in accordance with the present invention, includes the tensioning tool described above in connection with FIGS. 1, 2, and 3, a first cord 20 extending through throughhole 18 in body 10 of the tensioning tool, and a second cord 22 extending through hook 12 of the tensioning tool.

Figure 5:
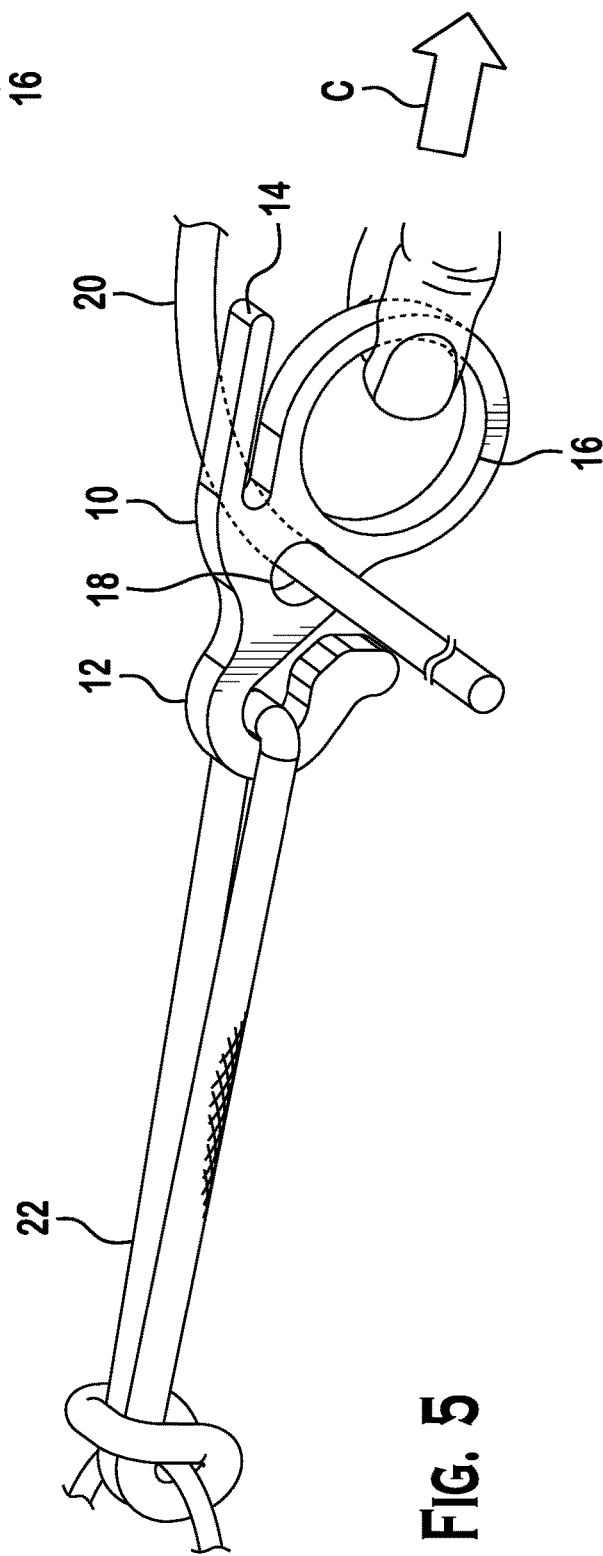
FIG. 5 is a perspective view of the FIG. 4 tensioning system at a second stage of deployment of the tensioning system.
Figure 6:
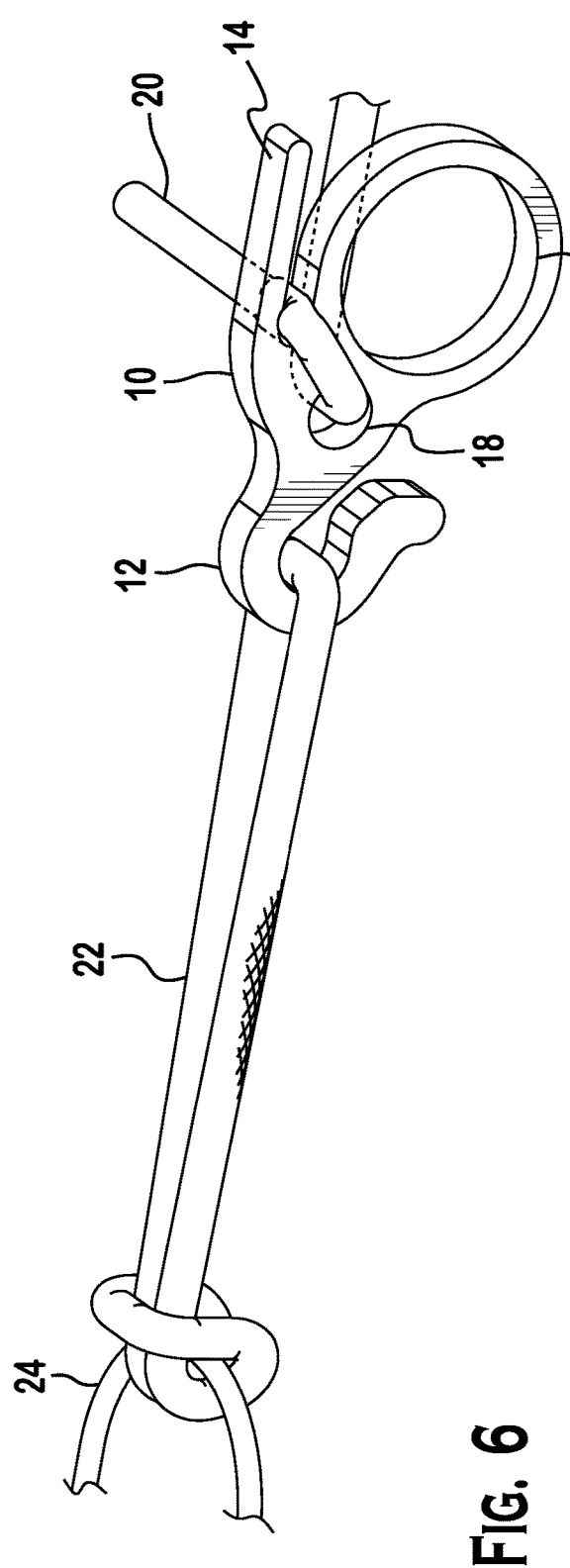
FIG. 6 is a perspective view of the FIG. 4 tensioning system at a third stage of deployment of the tensioning system.
Figure 7:
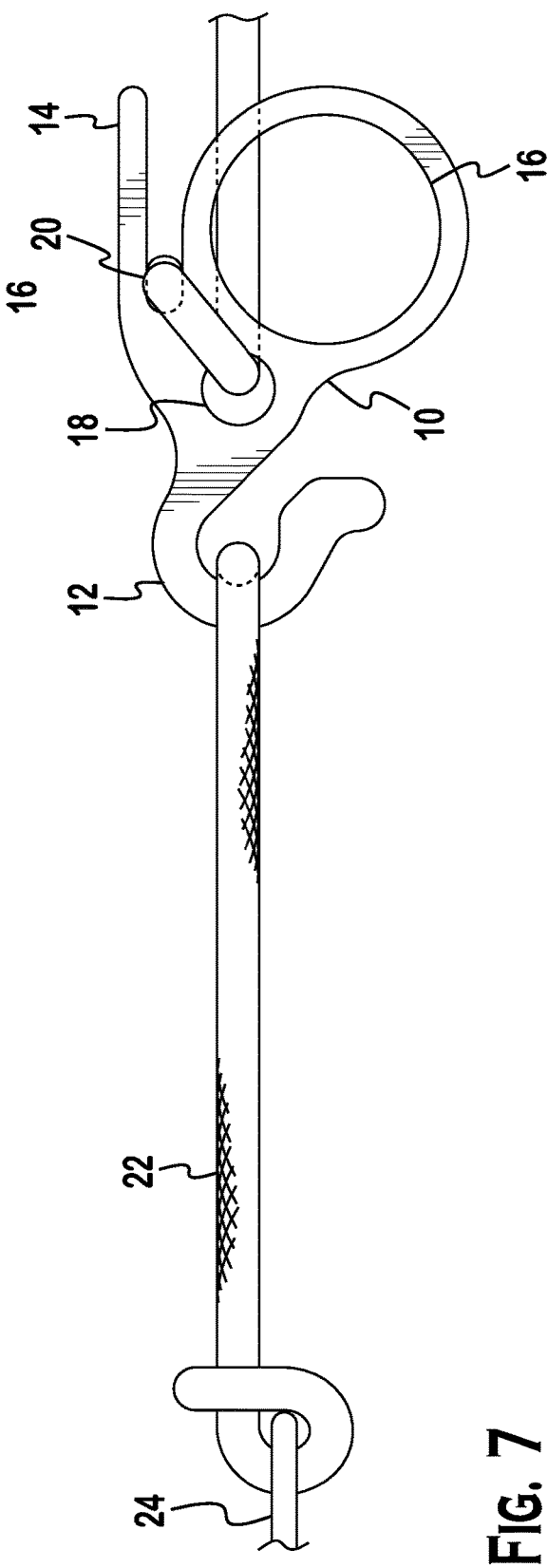
FIG. 7 is a side view of the FIG. 4 tensioning system at the third stage of deployment of the tensioning system.
Figure 8:
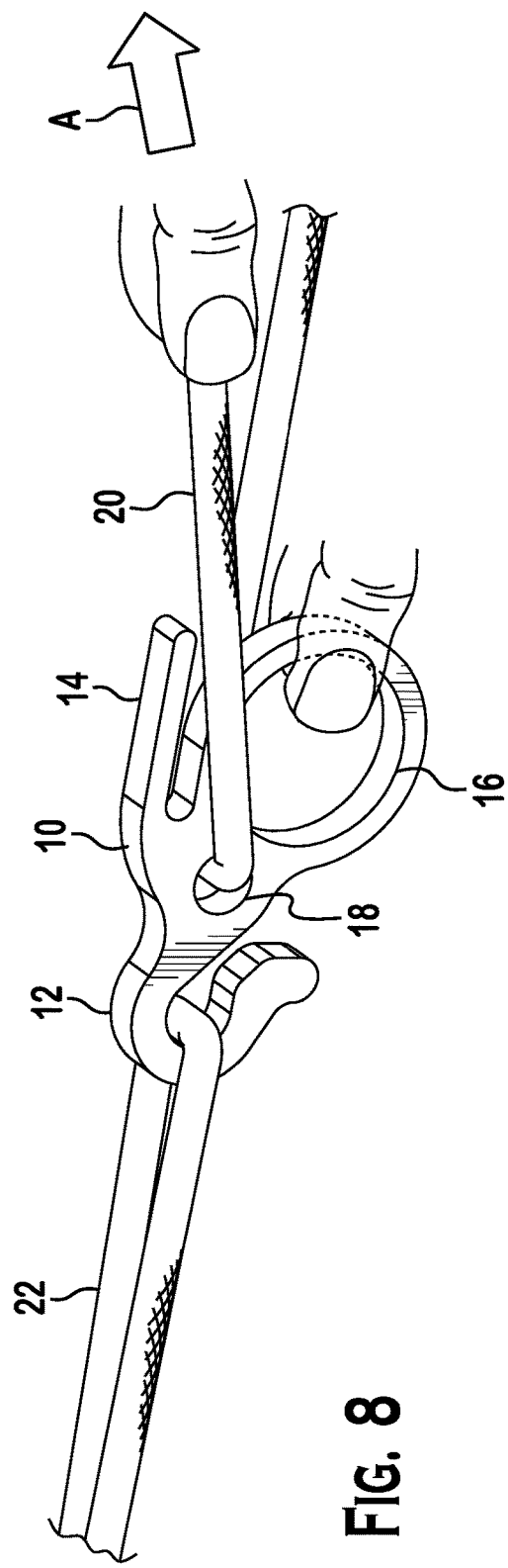
FIG. 8 is a perspective view of the FIG. 4 tensioning system at a fourth stage of deployment of the tensioning system.
Figure 9:
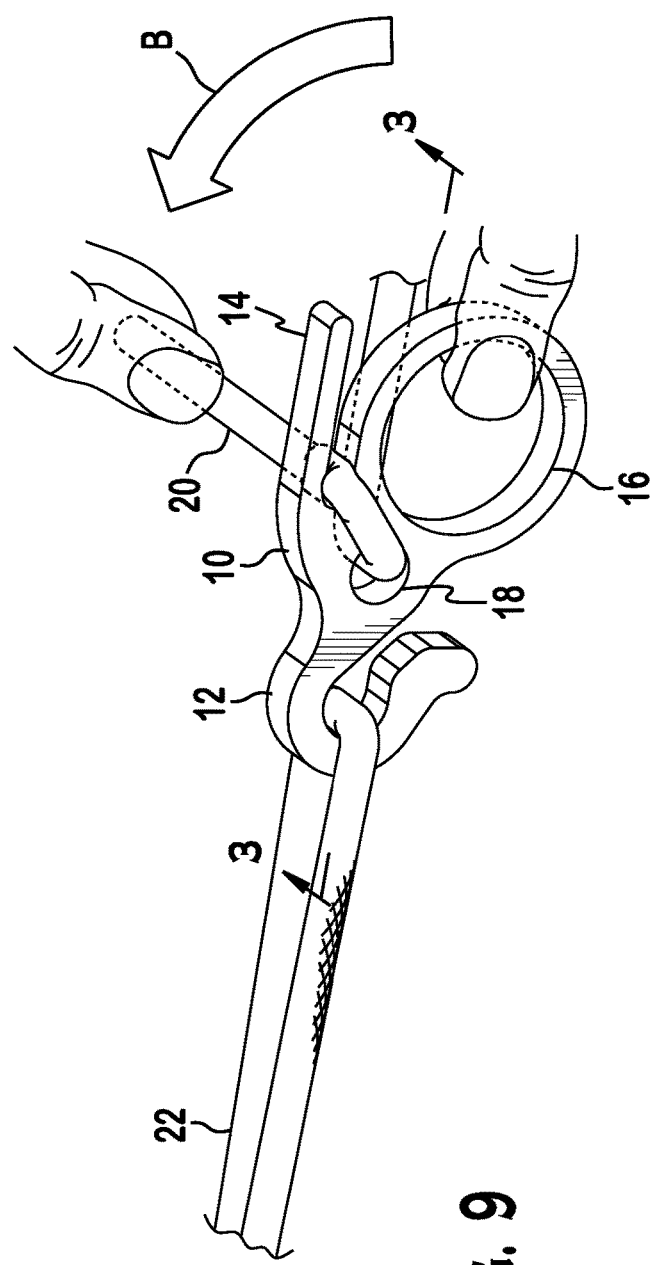
FIG. 9 is a perspective view of the FIG. 4 tensioning system at a fifth stage of deployment of the tensioning system.

Cord 20 is secured to the tensioning tool by being threaded through throughhole 18, as shown in FIGS. 4 and 5, and then pressed into hook 14, as shown in FIGS. 6, 7, and 9. More specifically, as shown in FIG. 8, after cord 20 is threaded through throuhhole 18 in the tensioning tool, cord 20 is pulled away from the throughhole as indicated by arrow A. Then cord 20 is fitted into hook 14 of the tensioning tool as indicated by arrow B in FIG. 9.

Cord 22 extends between the first hook 12 of the tensioning tool and, for example, webbing for camping equipment, such as tents, tarpaulins (tarps), hammocks, flys, and similar shelters or other structures, as represented by a handle 24.

In an exemplary embodiment, a method for deploying a tensioning system, constructed in accordance with the present invention, includes the following steps: (1) providing a tensioning tool having a body 10 having a grip opening 16 extending through the body and a throughhole 18 extending through the body, a first hook 12 extending radially outward from body 10 and having a closed end 12*b* remote from the body 10 and an open end 12*a*, a second hook 14 extending tangentially of body 10 and having a closed end 14*a* and an open end 14*b*, and (2) providing a first cord 20, (3) passing first cord 20 through the throughhole in body 10 of the tensioning tool as shown in FIG. 4, (4) fitting first cord 20 into second hook 14 of the tensioning tool as indicated by arrows A and B in FIGS. 8 and 9, respectively, (5) providing a second cord 22, (6) capturing the second cord 22 in first hook 12 of the tensioning tool, and (7) removing slack in the second cord 22 as indicated by arrow C in FIG. 5.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A tensioning tool comprising:
a body having:
   a first hook having an opening extending radially outward therefrom;
   a second hook having an opening extending tangentially away from the first hook;
a throughhole positioned between the first hook and the second hook and extending through the body, and
a grip opening extending through the body and positioned proximate to the throughhole, wherein the throughhole is positioned between the grip opening and the first hook, the grip opening having a larger opening than the throughhole, the first hook and the second hook, the first hook and the second hook extend along a same longitudinal axis of the body.

2. The tensioning tool according to claim 1 wherein:
(a) the first hook has an open end at the body and a closed end remote from the body, and
(b) the second hook has a closed end in proximity to the throughhole in the body.

3. The tensioning tool according to claim 2 wherein the first hook has the open end projecting outwardly from the longitudinal axis of the first hook.

4. A tensioning system comprising:
a tensioning tool having:
(a) a body having:
   (1) a grip opening extending through the body, and
   (2) a throughhole extending through the body,
(b) a first hook extending radially outward from the body, and
(c) a second hook having a tip, the tip and an outer most edge of the grip opening aligning perpendicular to a longitudinal axis extending from the first hook and the second hook, the second hook extending tangentially away from the body, a first cord extending through the throughhole in the body of the tensioning tool and the second hook of the tensioning tool; and
a second cord extending through the first hook of the tensioning tool, the first hook and the second hook extend along a same edge of the body.

5. The tensioning system according to claim 4 wherein:
(a) the first hook has an open end at the body and a closed end remote from the body, and
(b) the second hook has a closed end in proximity to the throughhole in the body.

6. The tensioning system according to claim 5 wherein: the first hook has the open end projecting outwardly from the longitudinal axis of the first hook.

* * * * *